United States Patent [19]

Johns, Jr. et al.

[11] Patent Number: 5,108,655
[45] Date of Patent: Apr. 28, 1992

[54] FOAM MONITORING CONTROL SYSTEM

[75] Inventors: Joseph W. Johns, Jr., Graycourt, S.C.; Joseph G. Katzel, Charlotte, N.C.

[73] Assignees: Electro-System, Incorporated, Charlotte, N.C.; Ross Chem, Incorporated, Fountain Inn, S.C.

[21] Appl. No.: 358,881

[22] Filed: May 30, 1989

[51] Int. Cl.$^5$ .................. B01D 19/04; G05D 9/00
[52] U.S. Cl. ........................ 252/321; 73/60.1; 162/45; 162/62; 210/750; 422/106
[58] Field of Search .............. 252/321; 162/45, 62; 210/750; 422/106; 435/812; 73/60.1

[56] References Cited

U.S. PATENT DOCUMENTS

| | | | |
|---|---|---|---|
| 2,336,526 | 12/1943 | Bristol | 417/297.5 |
| 2,981,693 | 4/1961 | Browne et al. | 252/321 |
| 3,120,125 | 2/1964 | Vasel | 73/293 |
| 3,317,435 | 5/1967 | Yamashita et al. | 252/321 |
| 3,401,712 | 9/1968 | White | 137/101.27 |
| 3,425,952 | 2/1969 | Gaughan et al. | 252/321 X |
| 3,427,252 | 2/1969 | Gaughan et al. | 252/321 X |
| 3,697,438 | 10/1972 | Lieberman | 252/321 |
| 3,739,795 | 6/1973 | Hyde et al. | 252/321 X |
| 4,009,118 | 2/1977 | Laiho | 252/321 |
| 4,038,650 | 7/1977 | Evans et al. | 340/619 |
| 4,084,426 | 4/1978 | Gales | 73/60.1 |
| 4,107,073 | 8/1978 | Maciaszek | 252/321 |
| 4,410,020 | 10/1983 | Lorenz | 141/65 |
| 4,624,745 | 11/1986 | Sande et al. | 162/254 X |

FOREIGN PATENT DOCUMENTS 1236817  6/1971  United Kingdom ........... 435/812

Primary Examiner—Richard D. Lovering
Attorney, Agent, or Firm—Bell, Seltzer, Park & Gibson

[57] ABSTRACT

This invention relates to a system for monitoring and controlling foam in a liquid tank utilizing a foam level sensing device positioned at a downstream location from a defoaming agent delivery arrangement. The foam level sensing device comprises a float having a plurality of foam sensors positioned at various levels above the float and provides signals to a control device regarding the level of foam in the tank. The control device provides instructions to the defoaming agent delivery arrangement so to provide a proper amount of defoaming agent to the tank. The defoaming agent delivery arrangement may be operated continuously and includes a backup delivery device for times when the delivery means runs out of defoaming agent or at times when foam is generated at an exceptional rate.

33 Claims, 2 Drawing Sheets

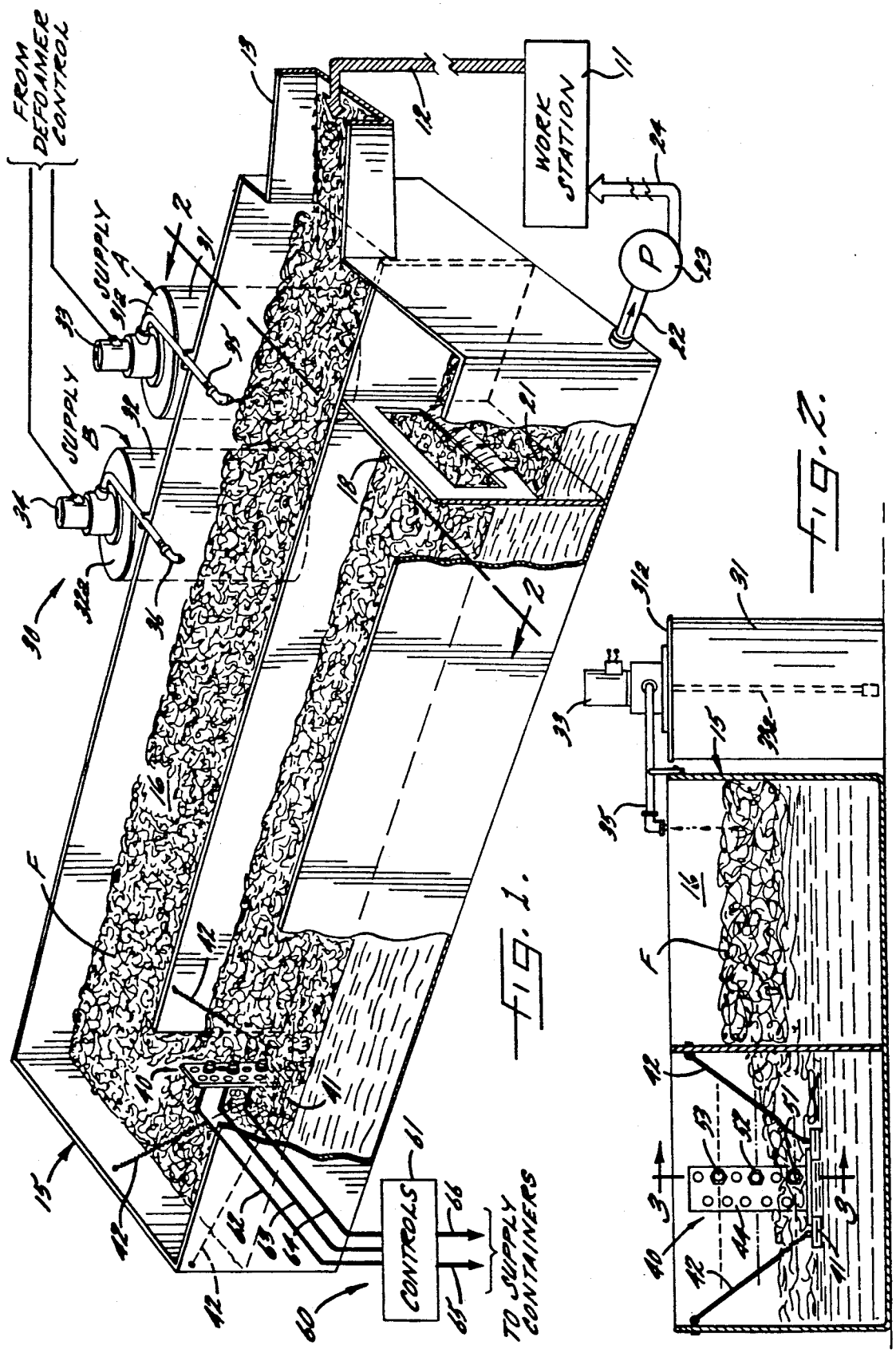

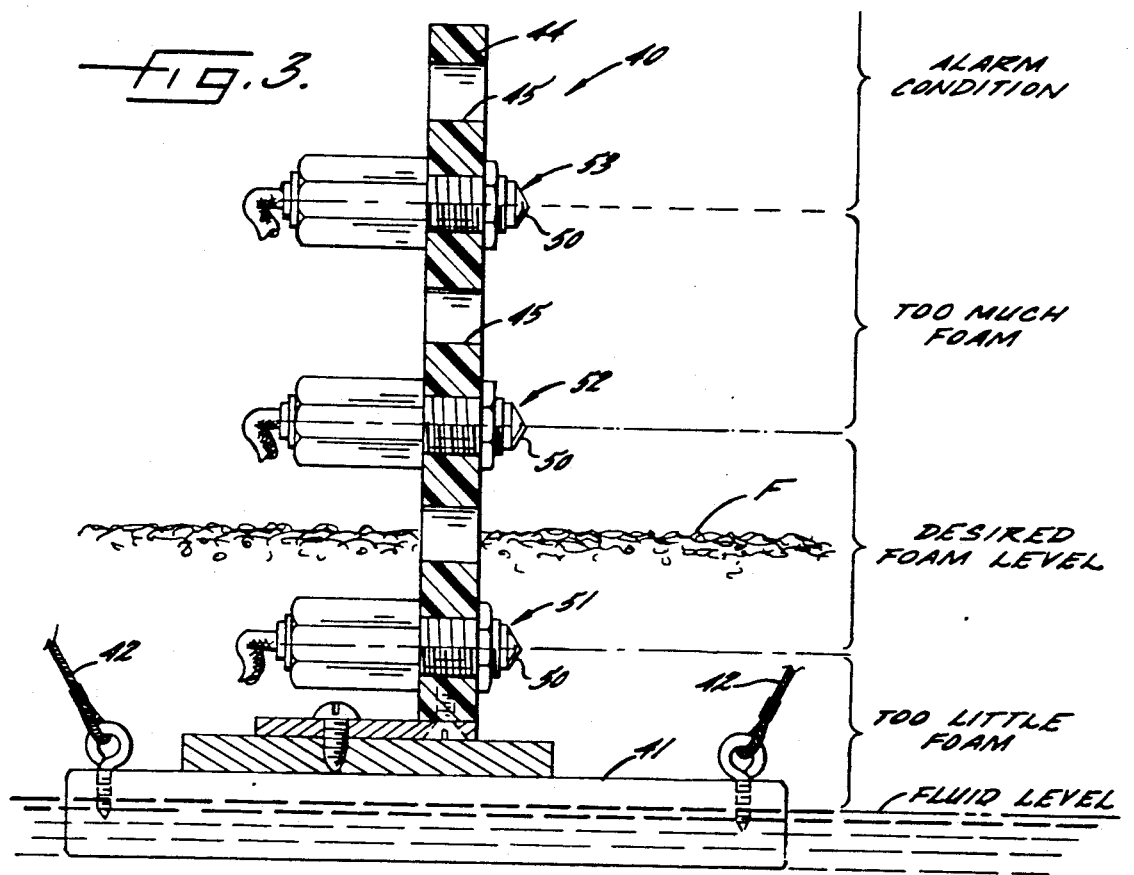
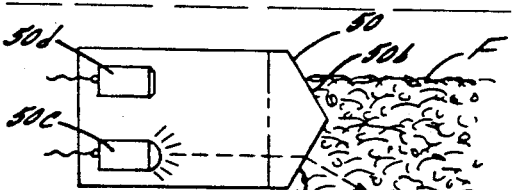
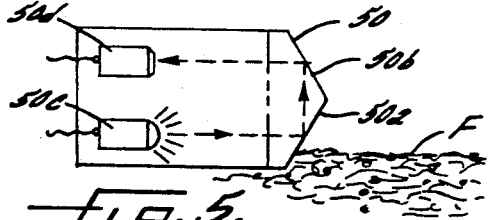
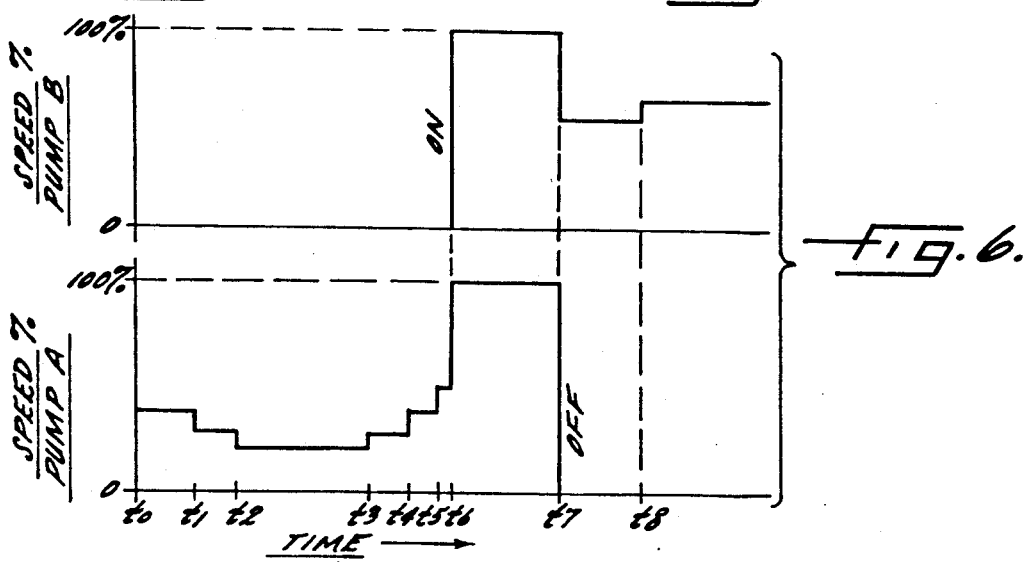

FOAM MONITORING CONTROL SYSTEM

FIELD OF THE INVENTION

This invention relates to control systems for monitoring foam in a liquid tank and more particularly to providing proper amounts of a defoaming agent to control the thickness of the foam.

BACKGROUND OF THE INVENTION

Foam is generated as a byproduct in many systems which include a circulation of water or other liquid. However, the generation of foam in most cases is only a problem when the foam becomes excessive and gets into other parts of the system. For example, in a waste water treatment system, air may be bubbled up through a tank of waste water to oxidize certain contaminants and facilitate their separation from the water. If there is soap or other foaming agent impurities in the waste water, a substantial amount of foam may be generated on the water in the tank. However, the foam would not otherwise present a problem until it overflows the tank and causes contamination in other parts of the treatment plant.

In a paper mill, for a second example, there are a number of systems that produce foam as a byproduct. For instance, foam is generated in the brown stock washer, the screen room, the bleach plant, and in the effluent. In each of these systems, a liquid, which is typically water, is circulated through a part of the paper making machine and picks up some sediment or other materials. In the process, the liquid may form a thick foam layer from the other materials in the liquid in combination with the agitation and turbulence of the flow. While a limited thickness may be acceptable, an excessive foam layer may overflow into the machine and contaminate the paper. Thus, the over production of foam must be avoided in a paper mill.

Foam is also generated as a byproduct in lubricating systems for large scale machine tools wherein the lubricating liquid is continuously recirculated. The liquid may pick up sediment and other debris that may cause a generation of foam. Excessive foam may impair the operation of the machine and interfere with the operation.

Clearly, foam may cause problems in a variety of systems. Fortunately a number of chemical defoaming agents are available to control such problems. However, defoaming agents vary widely in chemical formulation, cost, and effectiveness.

To control the foam, a conventional practice is to introduce an unattended continuous stream of defoaming agent into the system at a rate which is certain to prevent excessive amounts of foam. However, the foam producing impurities do not enter the system at a constant rate. Therefore, significant quantities of defoaming agent are wasted.

U.S. Pat. No. 4,009,118 to Laiho discloses an apparatus for controlling foam in a paper making system wherein the apparatus draws foam from the top of a filtrate basin and sprays a recycled defoaming agent onto the foam. As the defoaming agent becomes diluted over time, more defoaming agent is added to the recycling system. Laiho, however, is not suitable for handling very large amounts of foam that may be developed in the above described systems. Laiho also uses the defoaming agent at a rate which is preset and is not necessarily responsive to the current conditions in the filtrate basin. This risks using more or less defoaming agent than necessary and makes for a less than fully efficient system.

Accordingly, it is an object of the present system to provide an efficient system for controlling foam and which avoids the disadvantages of the prior art constructions as noted above.

It is a more particular object of the present invention to provide an efficient system for controlling foam which monitors the thickness of the foam and provides effective use of defoaming agent to maintain the thickness of the foam within a predetermined range.

SUMMARY OF THE INVENTION

The above and other objects have been achieved by the provision of a foam monitor and control system comprising supply means for delivering defoaming agent to a tank and means for sensing the thickness of the foam layer on the surface of a liquid in the tank. The system also includes means cooperating with the supply means and responsive to the sensing means for controlling the delivery of defoaming agent to the tank. Therefore, the thickness of the foam layer is maintained within a predetermined desired range.

Furthermore, the objects have been achieved by a process for controlling foam on the surface of a liquid in a tank wherein the process comprises delivering defoaming agent to the tank while sensing the thickness of the foam layer floating on the surface of the liquid, and while controlling adjusting the delivery of the defoaming agent in response to the thickness of the foam sensed by the sensing means so as to maintain the thickness of the foam layer within a predetermined desired range.

In further aspects of the invention, the foam thickness may be sensed at several different levels above the surface of the liquid and the controlling means may be set to automatically follow a predetermined course of action based on the thickness sensed. The defoaming agent may be delivered to the defoaming tank continuously and the rate of delivery may be adjusted periodically. The entire system therefore operates with minimal human involvement and will signal an operator at times when human intervention is necessary.

BRIEF DESCRIPTION OF THE DRAWINGS

Some of the features and advantages of the invention have been stated and others will become apparent as the description proceeds when taken in conjunction with the accompanying drawings in which FIG. 1 is a perspective view of a tank in which significant amounts of foam may be generated on the liquid surface and wherein a foam monitoring and control system embodying the features of the present invention is provided for monitoring and controlling the foam in the tank;

FIG. 2 is a transverse section view taken along line 2—2 on FIG. 1;

FIG. 3 is an enlarged section view taken along line 3—3 in FIG. 2;

FIG. 4 is a schematic elevation view of a foam sensor illustrating the characteristic reaction to foam;

FIG. 5 is a schematic elevation view similar to FIG. 4 but illustrating the characteristic reaction to air; and FIG. 6 is a graph illustrating the basic process of the foam monitoring and control system.

DETAILED DESCRIPTION OF THE PREFERRED EMBODIMENT

Referring now to the drawings, FIGS. 1-3 illustrate a preferred embodiment of the foam monitoring and control system operating in conjunction with a liquid recirculation system. The liquid recirculation system forms no part of the present invention and is therefore shown schematically to generally illustrate a system with which the foam monitoring control system may operate. Such liquid systems may take many forms as discussed above but generally all such systems have a few common features. In particular, all such liquid systems produce foam as a byproduct, at times generate excessive foam, such excessive foam generation may foul the system or cause other problems, and the system includes some type of tank or reservoir where the foam may form and collect.

The system illustrated in the drawings comprises a work station 11 wherein the liquid is used to cool, clean, or lubricate parts of that work station. In the work station 11 however the liquid picks up waste, impurities and other sediment which may act as a foaming agent. The liquid is collected at the work station 11 and delivered by a conduit 12 to a tank 15. The liquid enters the tank 15 at an inlet 13 and passes through the tank 15 along a circuitous path 16. As illustrated in FIGS. 1 and 2, the circuitous path 16 comprises a straight elongate run, a 180° turn and a second straight run alongside the first run. At the end of the circuitous path 16 is a weir 18 for containing sediment that has settled out of the liquid. The liquid passes through the weir 18 into reservoir 21 to be returned to the work station 11 in a generally closed loop by a pump 23. The pump 23 is connected to the reservoir 21 and the work station 11 by conduits 22 and 24. It should be noted that while the illustrated system is a closed loop system, the system may be an open loop where the liquid is directed out of the system rather than recirculated.

The liquid in most cases primarily consists of water with sediment and other materials used in the work station 11 and is pumped at a substantial rate which inherently agitates the water. Therefore the substantial agitation of liquid would tend to cause the liquid to foam up depending on the presence of any foaming agents in the liquid. The foam forms a layer on the surface of the liquid which may become thick enough to overflow the tank 15.

To counteract the generation of foam, chemical defoaming agents are known and available which may be added to the liquid to reduce the thickness of the foam layer. The chemical defoaming agents are available in a variety of compositions, strengths, and costs. However, as with all limited resources, it is important to use the defoaming agent efficiently. Furthermore, in a recirculating system, the defoaming agents may have some deleterious effects when used in excessive strengths. Accordingly, it is important to use the defoaming agent efficiently. For instance, if it is only necessary to keep the foam below a certain level, there is no need to use amounts of defoaming agent that will completely eliminate the foam. Furthermore, the foam generation may not necessarily be constant and there may be times when very little foam is generated and other times when the foam level rises greatly in a short amount of time. However, it is generally more efficient to provide the defoaming agent at a substantially continuous rate adjusted to control the foam rather than to wait until the foam level rises to a point that it cannot be easily controlled and where significant amounts of defoaming agent are necessary to bring the foam back into control. The peak usage in such a dangerously out of control situation tends to more than offset any savings from withholding the defoaming agent.

The preferred embodiment of the present invention will now be more particularly described particularly as it relates to controlling the foam in a liquid system such as described above. The invention comprises a defoaming agent supply means generally indicated by the reference numeral 30, a foam sensing means generally indicated by the reference numeral 40 and a control means generally indicated by the reference numeral 60. As illustrated, the supply means 30 is preferably positioned near the inlet 13 along the side the tank 15. The supply means 30 further comprises a pair of essentially identical first and second supply arrangements labeled SUPPLY A and SUPPLY B, respectively. Focusing on SUPPLY A, the first supply arrangement comprises an open top drum 31 for containing the defoaming agent. A lid 31a is arranged for closing the open top and preventing evaporation or contamination of the defoaming agent. A pump 33 is mounted to the lid 31a with a downwardly extending pick up pipe 33a (FIG. 2) connected to the input of the pump 33 for carrying defoaming agent up to the pump 33. A conduit 35 connected to the output of the pump 33 carries the defoaming agent to the tank 15 and allows the defoaming agent to drip into the foamy liquid.

Similar to the first supply arrangement SUPPLY A is a SUPPLY B comprising a drum 32 with a lid 32a and a pump 34. The pump 34 further includes a pick up pipe (not shown, but analogous to pick-up pipe 33a shown in FIG. 2 and a conduit 36 for delivering the foaming agent to the foamy liquid. These devices are situated in independent and parallel relation so that one acts as a backup for the other. In the preferred operation, as discussed in more detail below, the foam may be controlled by the operation of one delivery device. However, the other device is provided for situations where one device runs out of defoaming agent or has a malfunction or in rare circumstances where foam is being generated so fast and in such quantities that a very large amount of defoaming agent is necessary and this amount exceeds the amount that can be provided by one pump.

Downstream in the circuitous route 16, where the defoaming agent has already been added to the liquid, the foam should be under control. In the preferred operation of the invention, the foam sensing means, generally indicated by the numeral 40, is positioned downstream from the defoaming agent supply means 30 to assure that the layer of foam floating on the surface of the liquid is within a predetermined range. The foam sensing means 40 comprises a float 41 which has a catamaran configuration so as to provide minimal resistance to the liquid moving along the circuitous path 16. The float 41 is tethered by a plurality of tie-lines 42 to maintain the foam sensing means 40 in a particular position relative to the defoaming agent supply means 30. The tie-lines 42 are also suitably slack to accommodate varying levels of liquid.

Extending upwardly from the float 41 is a mast 44 with a plurality of holes 45 at various levels above the float 41. The holes 45 form a plurality of sensing stations at which sensors may be positioned to sense the thickness of the foam layer. Positioned in several of the holes 45 are a lower foam sensor 51, and a middle foam sensor 52 and an upper foam sensor 53. The foam sensors may be of any suitable type known in the art, such as conductivity sensors or ultrasonic sensors. A conductivity sensor essentially comprises a pair of spaced electrodes and an electronic circuit. When foam bridges the spaced electrodes, the circuit senses an increased conductivity across the electrodes and provides a signal indicating the foam level. An ultrasonic sensor comprises a transmitter which emits an ultrasonic signal down onto the foam and a receiver which receives the reflected signal from the foam. Since the signal travels at a known speed, the time it takes to return to the receiver is indicative of the distance between the sensor and the foam level.

While the above described sensors are useful with this invention, there are certain drawbacks to their use. In particular, the above described sensors may tend to become fouled during use. In the preferred arrangement of the invention, an optical light refracting sensor 50 (FIGS. 4 and 5) is used to sense the thickness of the foam F. The optical light refracting sensor 50 comprises a prism with prism sides 50a and 50b exposed to the foam F. As illustrated in FIG. 4, a light source 50c directs a light beam toward the prism. The refractive index of the material forming the prism is such that when foam F is overlying the prism, the surface 50a forms a refractive interface with the foam F which refracts the light beam out of the prism. However, as illustrated in FIG. 5, when the prism surfaces 50a and 50b are surrounded by air, the surfaces 50a and 50b form an internally reflective interface which reflects the light beam back to a light sensor 50d. The light sensor 50d thereby determines whether the foam layer is above or below the sensor 50 and provides an electrical signal indicative of the presence or absence of foam. As such, optical light refracting sensors essentially sense foam by detecting the threshold difference between the refractive indexes of foam and air. The light refracting sensors are sealed units, resistant to fouling and are generally more reliable than other known sensors which may be used in such an environment.

Such optical light refracting sensors are known for sensing liquids and are commercially available for such uses. An example of such a commercially available sensor is the Tedeco LEVELMASTER ® Electro-Optic Liquid Level Sensor LLS-84. However, to our knowledge, optical light refracting type sensors have not been designed, marketed or promoted for use in sensing foam.

The various levels of the sensors 50 above the float 41 are adjustable and should be determined in respect with the particular liquid system involved and its tolerance for excessive foam. The levels may be higher for a system that produces foam at a moderate rate and has a tolerance for excessive foam. On the other hand, a system that may quickly get out of control and is highly susceptible to a serious problem if the foam becomes out of control, should have much lower levels for the foam sensors. In determining the levels for the sensors, one should consider and define a desired range of foam levels at which the system would be in control. As particularly illustrated in FIG. 3, the lower foam sensor 51 is positioned at a level which defines the bottom of the desired range of foam levels and the middle foam sensor 52 is positioned at a level which defines the top of the desired range of foam levels. Next, the lowest level at which the foam is too high should then be determined and at this level, the upper foam sensor 53 is positioned. The various levels of the foam may thereafter be categorized. If the foam level is below the upper sensor 53, it is deemed "in control." When the foam level is "in control" it may further be considered "at equilibrium" if it is within the desired range. The foam level may be "in control" and "out of equilibrium" if it is above or below the desired range and below the upper sensor 53. When the foam level is above the upper sensor 53 it is considered "out of control," yet the system is provided with a predetermined course of action to bring the foam level back into control.

The foam sensing means 40, as described above, provides electrical signals related to the thickness of the foam layer floating on the surface of the liquid to a control means 60. The control means 60 comprises a control box 61 with three input lines 62, 63, and 64 from each of the three sensors 51, 52, and 53. If more sensors are provided, it should be apparent that the number of lines may be adjusted accordingly. The control box 61 also has two output lines 65 and 66 leading to the pumps 33 and 34. The control box 61 is provided with electronic circuitry to control the pumps 33 and 34 based on the foam thickness sensed by the sensing means 40. In particular, the control box 61 follows a predetermined course of action which may be programmed therein which shall maintain the foam thickness within control or return the foam thickness back into control.

Referring to FIGS. 3 and 6, the operation of the foam monitor control system may be more easily understood. Initially the system operates using just one pump designated as the lead pump. The other pump is designated as the lag pump. In the example illustrated in FIG. 6, PUMP A is initially designated the lead pump and PUMP B is designated as the lag pump. Initially the lead pump is set to operate at a speed just below 50% of its capacity so as to have a sufficient speed range to control a substantial growth of the foam level. The speed of the pump is of course directly related to the volume per unit time or the rate at which defoaming agent is delivered to the tank 15. In the specific example illustrated in FIG. 6, PUMP A is set to operate at approximately 40% of full speed. Initially in the example, the foam level is between the lower and middle sensor levels. As long as the speed setting for the lead pump maintains the foam level between the lower and middle sensors, or within the predetermined desired range, the control 60 does not alter the speed of either pump.

However, the speed of the lead pump will need to be adjusted at times when the foam level is outside the desired range. The adjustment should be moderate since the system was just previously at an equilibrium. It is unlikely that a substantial change in the rate is necessary since the foam level is still technically "in control." Further, an over reaction to an "out of equilibrium" condition may waste defoaming agent. Therefore, at a time when the foam level falls below the sensor 51, the control 60 sends a signal to the lead pump (pump 33) to reduce the speed by a particular increment. In the preferred embodiment, the increments are approximately 5% although this can be varied or adjusted depending on the situation or circumstances in the example, at a time indicated by t1, the lower sensor 51 has sensed that the foam level has fallen below the sensor level. In response thereto, the control box 60 instructs the pump 33 to decrease its speed by one increment. The control box 60 then waits a period of time for the foam level to return to the desired range although it may continually receive a signal from the lower sensor 51 indicating that the foam level is too low. The delay period is predetermined, and typically ranges from about twenty seconds to about five minutes. If at the end of the delay period the foam level is not above the foam sensor, the control 60 again instructs the pump 33 to decrease the speed by one increment. In the illustration of FIG. 6, this circumstance arises at time t2 where the speed is reduced again by the increment. After a second period of time, which may be the same or may be shorter, the control 60 may provide a further instruction to the pump 33 to reduce the speed. A shorter delay period is preferred in this instance so that the speed of the lead pump becomes more quickly responsive to bringing the foam level back into the desired range. In the example the foam has increased to a thickness within the desired range and further adjustment of the speed at this time is unnecessary.

During the subsequent operation, the pump 33 operates continuously at a constant rate until time t3. At time t3, the middle sensor 52 senses that the foam level has exceeded the desired range and the control 60 instructs the pump 33 to increase the speed by one increment. Similar to the procedure as described above, the control 60 waits a period of time before taking any further action. After the period of time has passed, and the foam level has not fallen below the middle sensor 52, the control 60 would issue a further instruction to the pump 33 to increase the speed. This is illustrated at time t4 wherein the lead pump increases the speed by a second increment. This process continues until the middle sensor 52 signals to the control 60 that the foam level is back in the desired range.

In some cases the foam level may get "out of control" when the foam level rises above the level of the upper sensor 53. In this case the upper sensor 53 signals the control 60 which takes the decisive action to bring the foam level back into control. At time t6, the upper sensor 53 senses that the foam level has become "out of control" and the control 60 instructs the lead pump to increase the speed up to 100% of its speed capacity. Control 60 further instructs the lag pump (pump 34) to begin pumping at 100% of its speed capacity. Ideally, operating both pumps at full speed will bring the foam level back into control or below the upper sensor 53. An alarm signal for an operator to check the situation may also be broadcast at this time or at a time delayed thereafter. The operator when summoned may investigate the situation and determine whether the foam monitor and control system will be able to bring foam level back into control. The human involvement at this time may be important because the causes of an out of control system are many and varied.

For example, if the drum in the lead delivery means becomes empty, the defoaming agent would not be delivered to the tank 15 even though the lead pump may itself be operating normally. In this circumstance, the foam level will get out of control. The work station may also release some substantially potent foaming agents that tend to cause an exceptional increase in the foam level which would cause a temporary out of control situation. The lead pump may further have a malfunction and stop working while the control 60 continues to instruct the pump to work at a certain speed. In most cases, the foam monitor and control system will bring the foam level back into control.

At time t7, the upper sensor 53 senses that the foam level is back in control. Thereafter the lead pump, PUMP A or pump 33 is shut off and the lag pump, PUMP B or pump 34 is instructed to reduce its speed to the speed that the lead pump was formerly operating at before the out of control situation. At this time, the control 60 changes its recognition of pump 34 or PUMP B from the lag pump to the lead pump. The control 60 also changes its recognition of pump 33 or PUMP A from the lead pump to the lag pump. Thereafter, the control 60 will operate as before but with the other pump being in operation. A signal for an operator may be provided at this time so that the operator checks the lag pump (pump 33) to make sure that there is plenty of defoaming agent and no malfunction with the pump. After time t7, the foam level is still above the middle sensor level 52. Accordingly, the control 60 will wait a period of time before adjusting the speed of the lead pump (pump 34). At time t8, a predetermined period has elapsed and the foam sensing means 40 continues to signal the foam level is above the middle sensor level 52. Therefore, the control 60 instructs the lead pump (pump 34) to increase its speed by one increment. As discussed before, the control 60 then waits another period of time for the foam level to come back within the predetermined range between the sensor 51 and 52. As indicated in FIG. 4, the lead pump 34 continues at a constant rate so the foam level is within the desired range or at equilibrium.

Accordingly, it should be appreciated that the liquid system is maintained under control with minimal human intervention and involvement. The foam level is controlled using the least amount of defoaming agent necessary. The system may operate continuously 24 hours a day and all the while constantly monitoring the foam level.

In the drawings and specification there has been set forth a preferred embodiment of the invention, and although specific terms are employed, they are used in a generic and descriptive sense only and not for purposes of limitation.

That which is claimed is:

1. An apparatus for controlling the thickness of a foam layer on the surface of a liquid in a tank so as to maintain the foam thickness generally within a predetermined range, the apparatus comprising:
   supply means for delivering defoaming agent to the tank;
   means for sensing the thickness of the foam layer on the liquid and including a float mounted for floating on the surface of the liquid, and at least one foam sensor supported by said float and positioned a predetermined distance above the liquid surface for sensing the thickness of the foam; and
   control means cooperating with said defoaming agent supply means and responsive to said sensing means for controlling the delivery of defoaming agent so as to maintain the thickness of the foam layer within a predetermined desired range.

2. The apparatus according to claim 1 wherein said sensing means comprises three sensors supported by said float and positioned at lower, middle and upper levels above the foam.

3. The apparatus according to claim 2 wherein said sensing means includes a vertically upstanding mast portion connected to and extending upwardly from said float and having a plurality of sensing stations at various levels above the float, said three foam sensors being adjustably positioned at selected ones of the various sensing stations for sensing the predetermined thicknesses of the foams, and means connecting said foam sensing devices to said control means for conveying signals indicative of the sensed thickness of the foam layer.

4. The apparatus according to claim 1 wherein said supply means comprises means for introducing a flow of defoaming agent at a predetermined rate.

5. The apparatus to claim 4 wherein said supply means comprises first and second supply arrangements for delivering defoaming agent to the tank and wherein said control means includes means for normally delivering defoaming agent from one of said supply arrangements while the other supply arrangement serves as a backup.

6. The apparatus according to claim 4 wherein said sensing means includes means for sensing when the foam thickness reaches a first predetermined level and said control means includes means for upwardly adjusting said rate of flow of defoaming agent in response to said sensing means sensing said first predetermined level.

7. The apparatus according to claim 6 wherein said sensing means includes means for sensing when the foam thickness decreases to a second predetermined level lower than said first predetermined level and said control means includes means for downwardly adjusting said rate of the flow of defoaming agent in response to said sensing means sensing the second predetermined level.

8. The apparatus according to claim 7 wherein said control means further comprises delay means for waiting a predetermined delay period after said rate is adjusted upwardly or downwardly and before said rate can be adjusted again.

9. The apparatus according to claim 6 wherein said sensing means includes means for sensing when the foam thickness reaches a third predetermined level higher than said first predetermined level and said control means includes means for further upwardly adjusting said rate of flow of defoaming agent in response to said sensing means sensing said third predetermined level.

10. The apparatus according to claim 9 wherein said supply means comprises first and second supply arrangements for delivering defoaming agent to the tank, and wherein said control means includes means for normally delivering defoaming agent from one of the supply arrangements while the other supply arrangement serves as a backup, and includes means operative in response to said sensing means sensing the third predetermined level for delivering defoaming agent from said other of said supply arrangements at a predetermined rate.

11. The apparatus according to claim 10 wherein said control means further includes means for upwardly adjusting the rate of delivery of said one supply arrangement in response to said sensing means sensing the third predetermined level.

12. The apparatus according to claim 10 wherein said sensing means includes means for sensing when the foam layer decreases below said third predetermined level, and said control means further includes means for stopping the flow of said one supply arrangement in response to said means for sensing said third predetermined level.

13. The apparatus according to claim 12 wherein said control means further includes means for signalling an operator in response to said means for sensing when the foam layer decreases below said third predetermined level so that the operator inspects the apparatus to assure that the apparatus is functioning normally.

14. An apparatus for controlling the thickness of a foam layer on the surface of a liquid in a tank so as to maintain the foam thickness generally within a predetermined range, the apparatus comprising;

supply means for delivering defoaming agent to the tank and including a first container and a first pump operatively associated therewith for delivering defoaming agent to the tank at an adjustable rate and a second container and a second pump operatively associated therewith for delivering defoaming agent to the tank at an adjustable rate, one of said pumps normally serving to deliver defoaming agent to the tank while the other pump serves as a back-up;

means for sensing the thickness of the foam layer on the liquid and including a float mounted for floating on the surface of the liquid, and a plurality of sensors supported by said float above the surface of the liquid for sensing the thickness of the foam layer at lower, middle and upper levels; and control means cooperating with said first and second pumps and responsive to said sensing means for adjusting the respective rates of delivery of the pumps so as to maintain the thickness of the foam layer within a predetermined desired range.

15. The apparatus according to claim 14 wherein said sensing means includes means for sensing when the foam thickness decreases below said lower level and said control means includes means for downwardly adjusting said rate of said one pump in response to said means sensing said lower level.

16. The apparatus according to claim 15 wherein said sensing means includes means for sensing when the foam thickness reaches said middle level and said control means includes means for upwardly adjusting said rate of said one pump in response to said sensing means sensing said middle level.

17. The apparatus according to claim 16 wherein said control means includes delay means for waiting a predetermined delay period after said rate is adjusted upwardly or downwardly and before said rate can be adjusted again.

18. The apparatus according to claim 16 wherein said sensing means includes means for sensing when the foam thickness reaches said upper level and said control means further includes for starting the other of said pumps at a predetermined rate in response to said sensing means sensing said upper level.

19. The apparatus according to claim 18 wherein said sensing means includes means for sensing when the foam level decreases below said upper level and said control means further includes means for stopping said one pump in response to said sensing means sensing said upper level.

20. An apparatus for controlling the thickness of a foam layer on the surface of a liquid in a tank so as to maintain the foam thickness generally within a predetermined range, the apparatus comprising:

supply means for delivering defoaming agent to the tank and including a first container and a first pump operatively associated therewith for delivering defoaming agent to the tank at an adjustable rate and a second container and a second pump operatively associated therewith for delivering defoaming agent to the tank at an adjustable rate;

means for sensing the thickness of the foam layer on the surface of the liquid, said sensing means comprising a float mounted for floating on the surface of the liquid, a vertical upstanding mast mounted to and extending upwardly from said float, a plurality of sensor stations on the mast positioned at various levels above the float, three optical light refracting type foam sensors adjustably positioned at lower, middle and upper predetermined levels in the sensor stations along the mast for sensing when the foam layer reaches said lower, middle and upper levels respectively;

control means cooperating with said first and second pumps and responsive to said sensing means so as to adjust the respective rates of delivery of the pumps in response to the foam thickness sensed by the foam sensing means, said control means including means for normally delivering defoaming agent from one of said pumps while the other pump serves as a backup, means for upwardly adjusting the rate of said one pump in response to said middle foam sensor sensing that the foam layer reaches the middle level, means for downwardly adjusting the rate of said one pump in response to said lower foam sensor sensing that the foam layer decreases below the lower level, delay means for waiting a predetermined delay period after adjusting the rate of said one pump before adjusting the rate again, means for increasing the rate of said one pump to its full rate and for starting said other pump to its full rate in response to said upper form sensor sensing that the foam layer reaches the upper level, and means for stopping said one pump and downwardly adjusting the rate of said other pump to the former rate of said one pump and signalling an operator to inspect the apparatus in response to said upper foam sensor sensing that the foam layer has decreased below the upper level.

21. In an apparatus for controlling the thickness of a foam layer on the surface of a liquid in a tank so as to maintain the foam thickness generally within a predetermined range, the improvement comprising means for sensing the thickness of the foam layer comprising a float mounted for floating on the surface of the liquid, and at least one foam sensing device supported by said float and positioned a predetermined distance above the liquid surface for sensing the thickness of the foam.

22. A method of controlling the thickness of a foam layer floating on the surface of a liquid in a tank comprising the steps of delivering defoaming agent to the tank, while sensing the thickness of the foam layer floating on the surface of the liquid, and while controlling the delivery of defoaming agent in response to the sensed thickness of the foam so as to maintain the thickness of the foam layer within a predetermined desired range, wherein said step of sensing the thickness of the foam comprises floating a foam thickness sensor on the surface of the liquid in the tank and sensing the foam thickness with respect to the surface of the liquid in the tank.

23. A method according to claim 22, wherein said step of sensing the thickness of the foam further comprises sensing the thickness at a plurality of different levels above the surface of the liquid.

24. The method according to claim 22 wherein the step of delivering the defoaming agent comprises continuously delivering the defoaming agent to the tank at an adjustable rate.

25. The method according to claim 24 wherein the step of sensing the thickness of the foam layer on the liquid comprises sensing when the foam layer reaches a first predetermined level, and said step of controlling the delivery comprises upwardly adjusting the rate in response to sensing that the foam layer reaches the first predetermined level.

26. The method according to claim 25 wherein the step of sensing the thickness of the foam layer further includes sensing when the foam layer decreases below a second predetermined level below said first predetermined level and said step of controlling the delivery comprises downwardly adjusting the rate in response to sensing that the foam layer reaches the second predetermined level.

27. The method according to claim 26 wherein said step of controlling the delivery further includes waiting a predetermined delay period after the rate is adjusted and before it can be adjusted again.

28. The method according to claim 26 wherein the step of sensing the thickness of the foam layer further includes sensing when the foam layer reaches a third predetermined level higher than said first predetermined level and said step of controlling the delivery further comprises upwardly adjusting the rate in response to sensing that the foam layer reaches the third predetermined level.

29. The method according to claim 28 wherein said step of delivering comprises delivering defoaming agent to the tank from a first supply arrangement, and said step of adjusting the rate in response to the foam layer reaching the third predetermined level further comprises additionally delivering defoaming agent to the tank from a second supply arrangement to thereby significantly increase the rate of delivery of defoaming agent to the tank.

30. The method according to claim 29 wherein said step of adjusting the rate in response to the foam layer reaching the third predetermined level further comprises upwardly adjusting the rate of delivery from the first supply arrangement.

31. The method according to claim 29 wherein the step of sensing the thickness of the foam layer includes sensing when the foam layer decreases below the third predetermined level, and said step of controlling the delivery includes stopping the delivery of defoaming agent from first arrangement in response to sensing that the foam layer has decreased below the third predetermined level while maintaining the delivery of defoaming agent from the second supply arrangement.

32. The method according to claim 31 further including the step of signalling an operator in response to sensing the foam layer has decreased below the third predetermined level.

33. A method of controlling the thickness of a foam layer floating on the surface of a liquid in a tank comprising the steps of:
delivering defoaming agent to the tank with first and second supply arrangements wherein one of said supply arrangements normally delivers defoaming agent and the other normally serves as a back-up;
sensing the thickness of the foam layer at lower, middle, and upper predetermined levels above the surface of the liquid by floating a foam thickness sensing means on the surface of the liquid in the tank and sensing the foam thickness with respect to the surface of the liquid in the tank, including sensing when the foam layer reaches the middle level, sensing when the foam layer decreases below the lower level, sensing when the foam layer reaches the upper level, and sensing when the foam layer decreases below the upper level; and controlling the delivery of defoaming agent from the supply arrangements so as to maintain the foam layer within a predetermined desired range, including upwardly adjusting the rate of the one supply arrangement in response to sensing that the foam layer reaches the middle level, downwardly adjusting the rate of the one supply arrangement in response to sensing that the foam layer decreases below the lower level, waiting a delay period after adjusting the rate before the rate can be further adjusted, increasing the rate of the one supply arrangement and starting the other supply arrangement at a predetermined rate in response to sensing that the foam layer reaches the upper level, and stopping the one arrangement in response to sensing that the foam layer decreases below the upper level.

* * * * *